Nov. 2, 1948.  I. E. McCABE  2,452,945
SEALED ELECTRIC MOTOR AND TRANSMISSION
Filed May 9, 1945  2 Sheets-Sheet 1
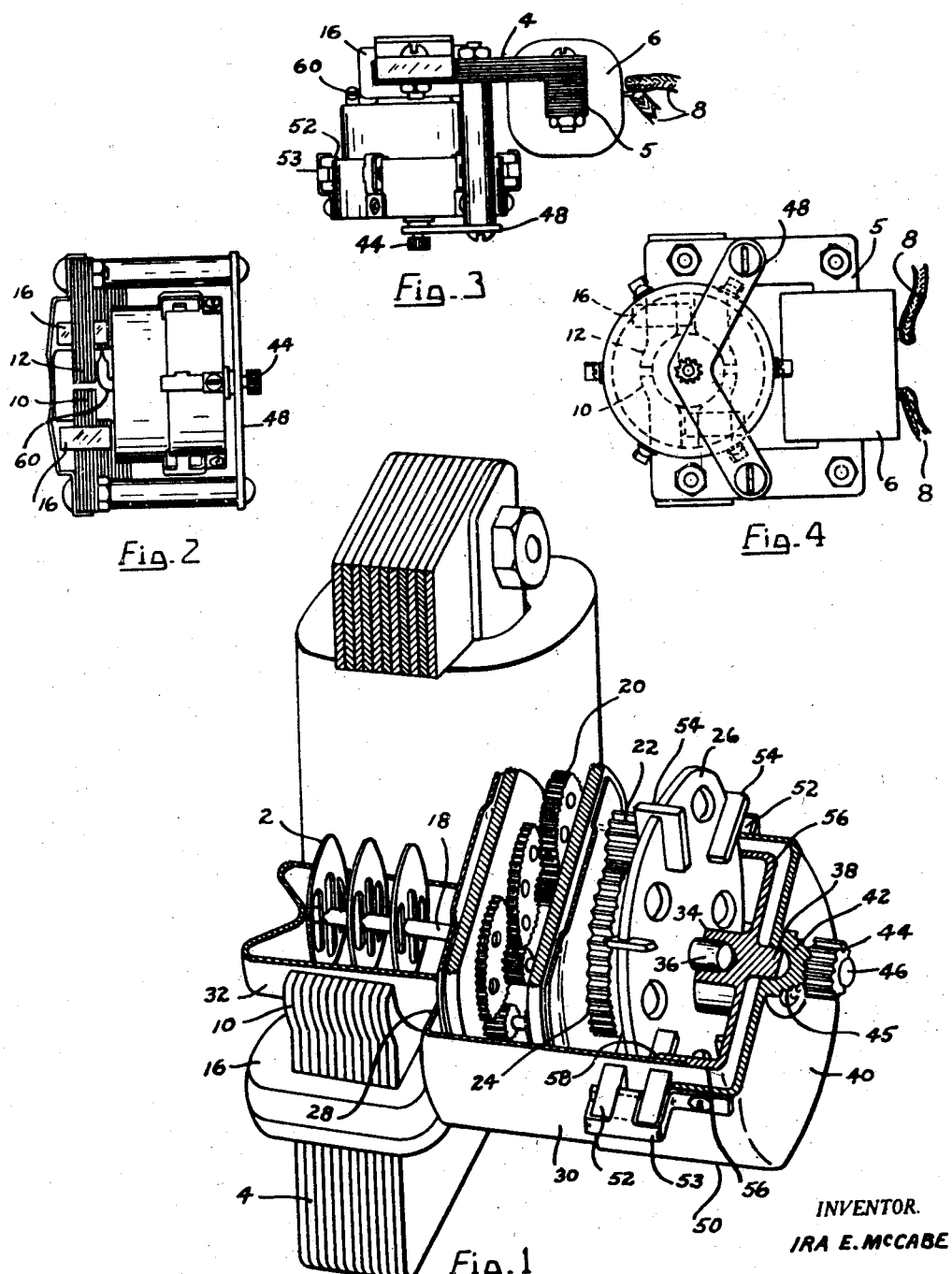
INVENTOR.
IRA E. McCABE
BY
Wilkinson Huxley Byron & Knight
ATTORNEY

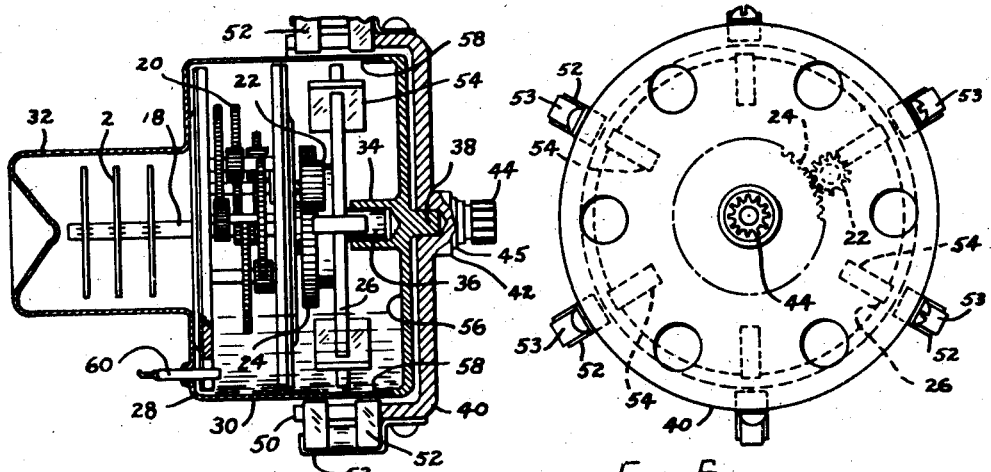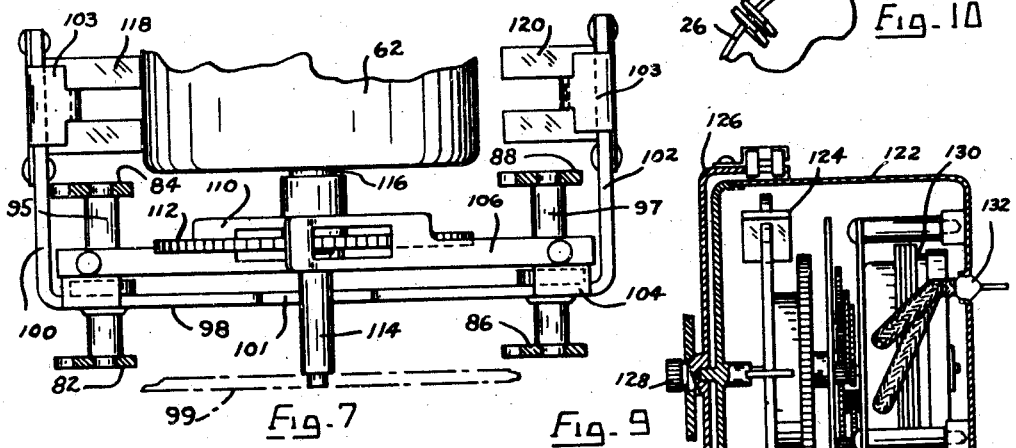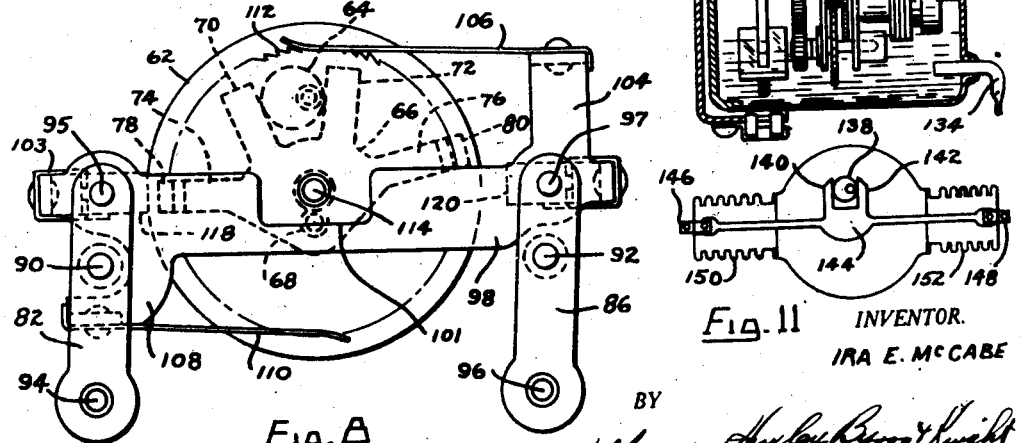

Patented Nov. 2, 1948

2,452,945

UNITED STATES PATENT OFFICE 2,452,945

SEALED ELECTRIC MOTOR AND TRANSMISSION

Ira E. McCabe, Chicago, Ill.

Application May 9, 1945, Serial No. 592,820

6 Claims. (Cl. 172—36)

The present invention relates to electric motors and more particularly to self-starting synchronous motors of the small type used in connection with clocks for domestic use and as power means in time operated domestic appliances.

Among the objects of the present invention is to provide a motor assembly which will assure proper lubrication of the operating parts of the motor over extended periods of time and which, after final assembly, will not require periodic or any further lubricating attention.

Electric motors of the type herein involved find many and varied uses, particularly in the domestic appliance field wherein the same are incorporated in various instrumentalities, such for example, as clocks, timepieces for use in connection with cooking ranges, as well as time actuating means in devices employed to control automatic coal feeding apparatus. One illustration of the latter use may be found in Patent No. 2,139,454, issued to applicant on December 6, 1938.

In all the uses suggested above there has been considerable difficulty in providing a motor so designed and constructed that the same will operate and perform silently and efficiently over long periods of time. Such motors as have been available have all been characterized as having one outstanding defect; namely, that after a period of time the same have become worn and noisy through insufficient lubrication, either as a result of neglect to lubricate or the lack of lubricating facilities in a motor intended to provide long operation with the lubricant provided when originally constructed. The seepage of oil out of the gear train enclosure, or foreign matter, such as dust and moisture into the bearings through the enclosure drive shaft bearing results, in time, in excessive wear followed with attendant noise or contamination of the bearing surfaces, thus leading to improper operation or stoppage of the same.

Where the motor is used in connection with assemblies, such as ranges or heaters, the motor driven appliance or device is brought into close proximity to the heat source of the range or heater so that if the interior of the time motor mechanism is accessible by way of the bearings, or otherwise, drying up of the oil contained therein can occur, or moisture and other foreign matter can enter therein to contaminate the oil, change its lubricating qualities and render it gummy and sticky. Alternate heating and cooling also creates a breathing action within the enclosure resulting in the driving out of oil vapors within, through the space between the motor shaft and bearing therefor. These lubricant deteriorating factors are particularly evident in connection with basement installed apparatus where, in addition to the above, the effects of sulphur contaminated atmospheres that are associated with the use of coal as a fuel, are detrimental.

Accordingly, it is an object of the present invention to improve upon the construction of synchronous electric motors to the end that the operating structure thereof needing lubrication may be contained within an hermetically sealed enclosure.

Another object of the present invention is to provide means for coupling or transmitting the power created within the hermetically sealed enclosure to the load or means to be operated exteriorly.

Another object of the present invention is to provide a sealed enclosure for the operating structure of synchronous electric motors employing a magnetic driving means whereby power derived from the motor may be transmitted from within the sealed enclosure to means disposed exteriorly of the said enclosure for the purpose of operating mechanism in accordance with the operation of said motor.

The present invention further contemplates an electric motor assembly including an enclosure for the operating mechanism of the motor and from which air may be exhausted to create a vacuum, whereafter lubricant of a predetermined quantity is injected and the container then sealed to hermetically enclose the mechanism and lubricant therein. In accordance with such contemplated objects of the invention, heat may be applied to the enclosure during the exhausting process to drive off water vapor or impurities inherent in, or associated with, the enclosed mechanism which would otherwise affect the lubricating qualities of the lubricant under heat conditions.

A further object of the present invention is to provide an hermetically sealed enclosure for the operating mechanism of an electric motor into which a gas, such as hydrogen or the like, may be introduced to prevent any changes in the lubricant contained therein because of excessively high temperatures to which the same may be subjected.

It is further contemplated by this invention to employ lubricants of such a character that, under vacuum or the gaseous atmosphere in which they are sealed, the lubricant at low heating temperatures, or under the influence of heat, generated by the motor in operation or adjacent thereto, will vaporize. When subjected to cooler temperatures thereafter such vapors will condense as oil upon the parts.

Other objects, features, capabilities and advantages are comprehended by the invention, as will later appear and as are inherently possessed thereby.

Referring to the drawings—

Figure 1 is an enlarged view in perspective of a motor embodying improvements made in accordance with the present invention, and showing certain parts in section to disclose more in detail the structure of said motor;

Figure 2 is an end view of the motor shown in Figure 1 of the drawings;

Figure 3 is a view in side elevation of the motor shown in Figure 1 of the drawings;

Figure 4 is a plan view of the motor shown in Figure 1 of the drawings;

Figure 5 is a view in section of the operating parts of the motor shown in Figure 1 of the drawings;

Figure 6 is a front view of the structure shown in Figure 5 of the drawings;

Figure 7 is an enlarged fragmentary view, partly in plan and partly in section of a motor assembly embodying certain modified structure contemplated by the present invention;

Figure 8 is a view in front elevation of the motor shown in Figure 7 of the drawings;

Figure 9 is an enlarged view in section of a motor assembly embodying a certain modified structural arrangement of the parts as contemplated by the present invention;

Figure 10 is a fragmentary view of a modified part of the motor assembly shown in Figure 5; and Figure 11 is an outline view of a modified structure contemplated by the present invention.

Referring now more in detail to the drawings, improvements according to the present invention are disclosed as being incorporated in a self-starting synchronous motor of the type used in domestic clocks or other similar timing devices. The motor is of conventional design in certain of its features and comprises a rotor or armature 2 and a field structure 4. The field structure 4 comprises a yoke of laminated construction having a transversely arranged section thereof forming the core 5 for a winding 6 which serves as an exciter when connected by the leads 8 to a suitable source of alternating current. The yoke is further formed with the inwardly extending arms providing field poles, such as 10 and 12, between which is disposed the rotor or armature 2. These pole pieces are provided with shading means 16 for causing the magnetic flux in some of the pole pieces to lag behind the flux in other pole pieces to provide a self-starting motor.

In the particular motor structure as disclosed, the rotor, through its shaft 18, is adapted to drive a gear train, generally referred to as 20. This gear train has, as its last operating element, a pinion 22 meshing with a gear 24 operatively connected to a disc 26, constituting an actuator or driver, as will be hereinafter more fully described. The armature, gear train and actuator are operatively mounted within a housing or enclosure 28 formed with a relatively large cylindrical section 30 for the gear train and actuator and a relatively smaller cylindrical section 32 enclosing the rotor 2 which is operably mounted within the cylindrical space between the pole pieces 10 and 12. Such mounting means for the mechanism enclosed within the housing 28 is constituted, for example, by suitable bearings such as 34 extending inwardly from the end wall of the enlarged cylindrical section 30, which is adapted to receive the stub shaft 36 extending laterally from the face of the actuator disc 26.

The housing 28 is provided with a bearing element 38 coaxially arranged with respect to the shaft 36 and projecting laterally of the end wall of the enlarged section 30, which element provides a support for a cylindrical shell-like member 40 formed with the hub 42 fitting over the bearing element 38 and providing a support for a pinion gear 44, likewise coaxially arranged with respect to the bearing elements 36 and 38. This pinion is mounted upon a shaft 46 secured at one end in the hub 42. Inwardly of the pinion 44, the hub 42 is shouldered, as at 45 to provide a portion adapted to be mounted in a bracket 48 secured, as disclosed in Figure 4, to the yoke 2 of the motor, as will be apparent. The bracket 48 and element 38 provide mounting means for the member 40 whereby the same may be rotated about the end of the enlarged section 30 of the housing.

The shell-like member 40 is formed with a cylindrical skirt portion 50 extending axially about the enlarged section 30 and has a plurality of permanent magnets 52 secured thereto in angular spaced relation with respect to one another about the periphery thereof by means of brackets 53.

The actuator 26 is further characterized as having a plurality of slots extending radially inwardly from the periphery thereof in which are mounted a plurality of magnetic pieces 54 extending outwardly into proximity to the wall of section 30. These magnetic pieces 54 are provided in equal numbers to the permanent magnets 52 and if desired the same may be constituted as a single or multi-part construction, as shown in Figure 10. The number of magnetic pieces carried by the disc will be determined by their size and the relationship of the load to be handled to the magnetic force needed to bring about transmission of the movement of the actuator or driver 26 to the pinion 44 connected with the load.

As shown in the drawings, the enlarged section 30 is provided with an enclosure cap 56 fitting the shell-like wall forming the said section 30 as at 58, which joint may be suitably sealed to provide a complete closure for the operating mechanism of the motor. The present invention further contemplates an enclosure from which air may be exhausted and, accordingly, a conduit 60 may be provided which is tipped-off as disclosed to provide a vacuum within the housing 28. On the other hand, it may be desirable not to establish a vacuum but to introduce a small amount of gas, such as hydrogen, nitrogen or the like. In this case such gas may be introduced through the conduit 60.

From the above description it will be readily appreciated that the improvements embodied in a conventional self-starting synchronous motor as herein shown will provide an hermetically sealed motor operated mechanism which will remain lubricated indefinitely and the lubricant removed from contamination with elements which could affect its lubricating qualities and life. Since the mechanism remains sealed within a vacuum, the effects of heat under such condition can produce an oil vapor in which the mechanism will function, thus adding to the conventional means of carrying oil over the operating parts to further insure lubrication.

While reference has been made to sealing the operating parts in a vacuum whereby a suitable lubricant may be employed which will vaporize upon heating to thereafter condense upon the parts, there may be circumstances where the motor is subjected to high ambient temperatures, in which event it will be preferable not to establish a vacuum but to admit a small amount of gas, such as hydrogen or nitrogen, which will prevent such temperatures from breaking down or changing the characteristics of the lubricating oil.

It can be readily seen that the motor construction hereinabove described provides proper lubrication over indefinite periods of time for the high speed, rapidly moving parts thereof where lubrication is an essential need. Since the parts operated by the motor at low speed are disposed exteriorly of the motor enclosure such low speed operating parts can be provided with bearings made of materials needing no lubrication, such as those commonly referred to as oil-less bearings. Accordingly, an entire appliance can thus be made which will be free of lubricating attention after construction.

In Figures 7 and 8 of the drawings an alternative form of construction for an electric motor of the type herein under consideration is disclosed. In these figures, the electric motor is provided with an housing 62 containing operating mechanism much on the order of that disclosed in Figures 1 to 6 inclusive, which includes a train of gears for operating a cam member 64. This cam element is operatively associated with an actuator 66, mounted for pivotal movement as at 68 within the housing 62. The actuator 66 is formed with the arms 70 and 72 embracing the cam 64 and with the oppositely disposed arms 74 and 76 adapted to carry magnetic pieces 78 and 80, which conform substantially to the magnetic pieces 54 of the first described embodiment. Since the cam member 64 continuously rotates upon operation of the motor, it will be apparent that the member 66 is tilted or oscillated from a position, such as represented in Figure 8 wherein the arm 74 is substantially horizontal, to a reverse position where the arm 76 is in a substantially horizontal position.

Disposed exteriorly of the housing is a rockable frame structure constituted in part by supporting links such as 82 and 84, adjacent one side of the housing 62, and 86 and 88 disposed adjacent the other side of the housing 62. These pairs of links are interconnected by elements 90 and 92 and are pivotally supported as at 94 and 96 upon any suitable frame structure which may be associated with the motor. Pivotally mounted upon, and extending between, the link structure as at 95 and 97 is a cross-beam 98 of substantially U-shaped construction having the free ends 100 and 102 thereof extending substantially axially with relation to the housing 62. At one end of the beam 98 is an upwardly extending bracket 104 adapted to provide a support for a pawl 106. Adjacent the other end of the beam 98 is a depending bracket 108 providing a support for a pawl 110. Each of these pawls 106 and 110 has an enlarged slotted free end as disclosed in Figure 7 of the drawings adapted to engage the teeth of a ratchet 112. The ratchet 112 is mounted on a shaft 114 journaled in a plate 99 adjacent the front side of the cross-beam 98 and mounted at the other end thereof upon a bearing 116 projecting from the housing 62. The cross beam 98 is cut out as at 101 to provide clearance, during oscillation, for the shaft 114.

The end portions 100 and 102 of the cross-beam 98 are provided with brackets 103 for securing the permanent magnets 118 and 120 in opposed relation to the wall of the housing 62.

It will be quite apparent that when the cam 64 approaches the position as shown in Figure 8 of the drawings, the magnetic piece or pieces 78 carried by the arm 74 will be disposed in a position to be subject to the influence of the permanent magnets 118, causing the frame to oscillate to the right as shown in that figure. Under these conditions, the pawl 106 is effective to rotate the ratchet 112 and to accordingly transmit such rotary movement through the axle 114 to the load to which the same may be connected. As the cam 64 continues to rotate and assumes a position diametrically opposed to that shown in Figure 8, the magnetic piece or pieces 80 carried by the arm 76 will be moved into a position to be influenced by the permanent magnets 120, thus causing the tiltable frame to move to the left as viewed in that figure. Under these conditions, pawl 110 is now effective to rotate the ratchet 112. There is thus provided a mechanism for intermittently moving the ratchet 112 in accordance with a continuous rotary movement of the cam 64 through the gear train for the motor.

In Figure 9, a further alternative construction for an electric motor is disclosed, the same essentially conforming to that disclosed in Figures 1 to 6 of the drawings, except that in this modification the entire structure for the motor is enclosed together with the gear train and actuator within an housing 122. In this embodiment the actuator 124 is adapted to drive the element 126, as hereinbefore described in connection with the embodiment of Figures 1 to 6, and which driven element 126 is adapted, through the medium of a pinion 128, to drive any desired load to which the same is connected. In the form of the invention as disclosed in Figure 9, the leads 130 for the motor are hermetically sealed with respect to the housing 122, through the medium of a pair of adjacent terminals 132. so that a suitable connection may be effected with a source of alternating current exteriorly of the housing. Additionally, this embodiment may be provided with a tubular element 134, either for creating a vacuum within the housing 122, or for exhausting, drying and thereafter introducing some suitable gas and which thereafter may be sealed or tipped-off to provide an hermetically sealed enclosure for the electric clock and its operating mechanisms. Furthermore, this construction is particularly adapted for use in connection with apparatus intended for operation in industrial capacities where chemically contaminated atmospheres exist which are normally destructive and injurious to lubricants.

In Figure 11 of the drawings is disclosed diagrammatically a still further embodiment of the invention, whereby operative movements of the mechanism within the hermetically sealed housing are transmitted exteriorly thereof. The driving means of this embodiment conforms substantially to that disclosed in Figures 7 and 8 of the drawings and is hermetically within the enclosure or housing 136. Such driving means includes a cam 138 embraced by the arms 140 and 142 of a link 144 connected at one end to the stud 146 and at the other end to a stud 148. These studs are mounted in the end walls of the bellows 150 and 152 which extend outwardly from the housing 138 in opposed relation to one another and are hermetically sealed with respect thereto. The bellows are contracted and expanded by the oscillatory movement of the link 144, which is operated by the cam 138. Studs 146 and 148 may be suitably connected to a rockable frame structure mounted exteriorly of the housing 138 and conforming to that shown in Figures 7 and 8 of the drawings. It will, therefore, be quite apparent that operative movements from the mechanism within the housing are transmitted, through the link 144, to the rockable frame structure to secure intermittent rotation of a shaft, such as 114, of the structure shown in Figures 7 and 8 of the drawings.

All of the advantages above enumerated in the description of Figures 1 to 8 are possessed by the structure of Figure 11, in addition to which the same provides means of applying power to larger loads than may be handled by means of a magnetic coupling. If desired, the structure of Figure 11 may be incorporated in an housing such as shown in Figure 9 to secure the advantages hereinabove set forth in the description of that modification of the invention.

While I have herein described and upon the drawings shown illustrative embodiments of the invention, it is to be understood that the invention is not limited thereto but may comprehend other constructions, arrangements of parts, details and features without departing from the spirit of the invention.

What is claimed is:

1. In a synchronous motor, the combination of a field structure, an armature associated with said field structure, means driven by said armature, an housing providing an hermetically sealed enclosure for said armature and said driven means, said driven means including a gear train, a cam member operated by said gear train, and an actuator oscillatably operated by said cam member, means mounted for oscillation exteriorly of said housing, and means for operating said last-named means in accordance with the movement of said actuator.

2. In a synchronous motor, the combination of a field structure, an armature associated with said field structure, means driven by said armature, an housing providing an hermetically sealed enclosure for said armature and said driven means, said driven means including a gear train, a cam member operated by said gear train, and an actuator oscillatably operated by said cam member, means mounted for oscillation exteriorly of said housing, magnetic means for operating said last-named means in accordance with the movement of said actuator, and means driven by said last-named means.

3. In a synchronous motor, the combination of a field structure, an armature associated with said field structure, means driven by said armature, an housing providing an enclosure for said armature and driven means, said driven means including a gear train, a cam member operated by said gear train, and an actuator oscillatably operated by said cam member, a frame structure oscillatably mounted exteriorly of the said housing, magnetic means for establishing a driving relation between said actuator and said frame, and means for translating movement of the frame into intermittent rotary movement.

4. A synchronous motor according to claim 3, wherein a pawl and ratchet mechanism is operatively associated with said frame whereby said ratchet is intermittently rotated in accordance with the oscillatory movement of said frame.

5. In an electric motor, the combination of a field structure, an armature associated with said field structure, means driven by said armature including an actuator, an housing forming an hermetically sealed enclosure for said armature and said driven means, and means embodying expansible and contractible means forming a part of said housing for operating said last-named means in accordance with the operation of said actuator.

6. The combination of a synchronous motor, a gear train driven thereby, an actuator driven by said gear train, an housing forming an hermetically sealed enclosure for said motor, gear train and actuator, means extending through said housing for establishing an electric circuit for operating said motor, means mounted exteriorly of said housing adapted to be operated in accordance with the operation of said actuator, and means embodying expansible and contractible means forming a part of said housing for operating said last-named means in accordance with the operation of said actuator.

IRA E. McCABE.

REFERENCES CITED

The following references are of record in the file of this patent:

UNITED STATES PATENTS

| Number | Name | Date |
| --- | --- | --- |
| 280,322 | Nash | June 26, 1883 |
| 1,192,706 | Thomson | July 25, 1916 |
| 1,696,132 | Wermeille | Dec. 18, 1928 |
| 1,757,840 | Lea | May 6, 1930 |
| 2,003,163 | Warren | May 28, 1935 |
| 2,243,555 | Faus | May 27, 1941 |